No. 713,273. Patented Nov. 11, 1902.
I. H. ALEXANDER.
DENTAL MATRIX CROWN.
(Application filed June 9, 1902.)
(No Model.)
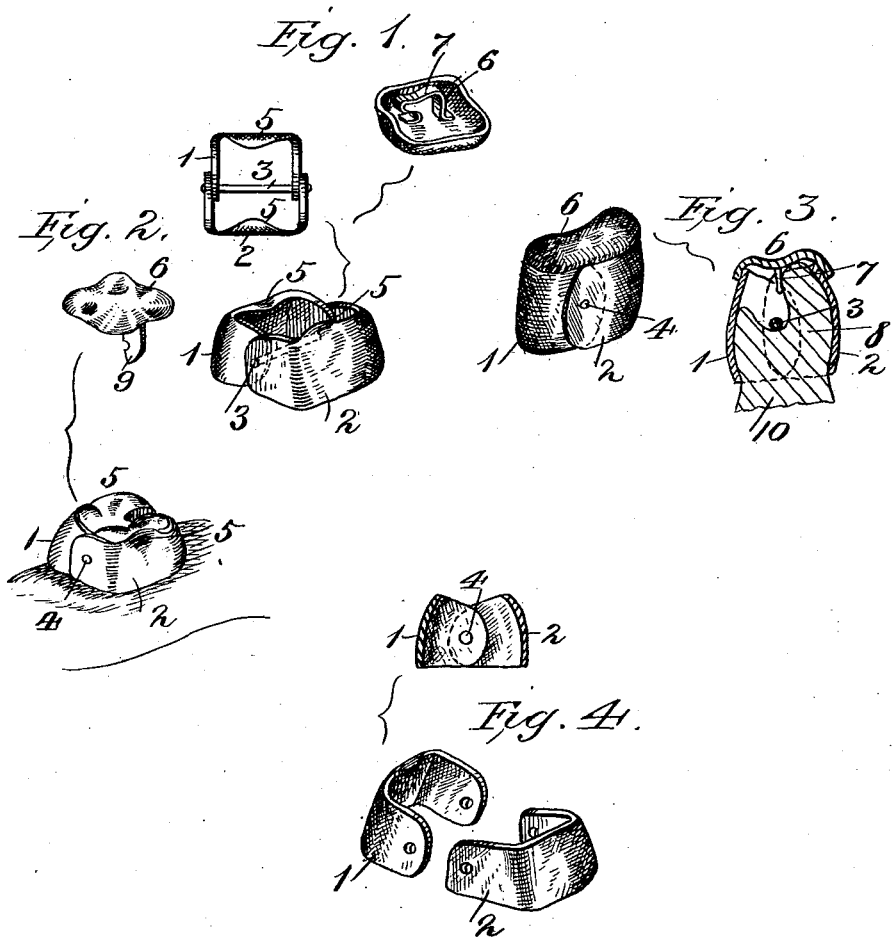

UNITED STATES PATENT OFFICE.

ISAAC H. ALEXANDER, OF CAMDEN, SOUTH CAROLINA.

DENTAL MATRIX-CROWN.

SPECIFICATION forming part of Letters Patent No. 713,273, dated November 11, 1902.

Application filed June 9, 1902. Serial No. 110,838. (No model.)

*To all whom it may concern:*

Be it known that I, ISAAC H. ALEXANDER, a citizen of the United States, residing at Camden, in the county of Kershaw and State of South Carolina, have invented certain new and useful Improvements in Dental Crowns, of which the following is a specification.

My invention relates to dental crowns, and more particularly to matrix-crowns, and has for its object to so construct the same that it may be readily placed on a tooth and filled with any of the plastic materials known in the art.

In the drawings forming a part of this specification, and in which like symbols of reference represent corresponding parts in the several views, Figure 1 is a view of the matrix and crown; Fig. 2, a similar view to Fig. 1 of the matrix and cap, slightly modified. Fig. 3 is a view of the device in operative position on a tooth, and Fig. 4 a sectional view of the matrix.

1 and 2 represent sections of the matrix connected by a bolt 3 or pivots 4, as desired, permitting play of the parts.

5 indicates depressions in the matrix to conform to the shape of the tooth.

6 indicates a cap to be placed on the top of the tooth or crown, but not with gold crowns, and 7 indicates a loop adapted to be embedded in the plastic material 8 of which the tooth is formed to hold the same in place.

9 is a pin which may be used in lieu of loop 7 when desired, being better adapted for certain conditions of teeth than is the loop, and in certain cases I preferably use a staple. The shape of matrix will depend on tooth. In other words, the matrix-crown is made the shape of the tooth to be formed and of a size to fit the root or neck thereof.

In Fig. 3 I have shown a tooth with appliance attached in accordance with my invention, in which 10 represents the tooth-root; 1 and 2, the sections of the matrix; 3, the bolt, and 7 the loop.

The operation of the device is as follows: The matrix-crown is first placed on the tooth and the plastic material, composed of cement, gutta-percha, amalgam, or the like, is worked in the same, the matrix by its pivotal condition conforming to the condition of the tooth. When using cement, the crown can be filled first and pressed in position. The cap is then placed on the tooth, the loop, staple, or pin is embedded in the plastic material, and the crown formed. This crown is intended to be a permanent affair and form a part of the tooth. When used with plastic gold, the cap will not of course be necessary. The bolt 3 is preferably used in the case of teeth badly broken down and the pivots where the teeth are in fair condition, and the cap 6 may or may not be placed on the teeth, as desired.

Having now fully described my invention, what I claim as new, and desire to secure by Letters Patent, is—

1. A dental crown, composed of a pivoted sectional adjustable band, in combination with plastic material forming the biting-surface and adapted to be received and retained by the same.

2. In a dental crown, the combination with a sectional band connected by a single bolt passing through the plastic material, which is adapted to be received within and retained by the band.

3. A dental crown, composed of a pivoted sectional adjustable band, in combination with plastic material adapted to be received and retained by the same, and a cap with its projection adapted to be received and retained by the plastic material upon the crown.

In testimony whereof I affix my signature in presence of two witnesses.

ISAAC H. ALEXANDER.

Witnesses:
E. F. BISSELL,
H. D. NILES.